United States Patent
Johnson et al.

(10) Patent No.: US 9,264,398 B2
(45) Date of Patent: Feb. 16, 2016

(54) LOADING AN OPERATING SYSTEM OF A DISKLESS COMPUTE NODE USING A SINGLE VIRTUAL PROTOCOL INTERCONNECT ('VPI') ADAPTER

(71) Applicant: LENOVO ENTERPRISE SOLUTIONS (SINGAPORE) PTE. LTD., Singapore (SG)

(72) Inventors: Jarrod B. Johnson, Raleigh, NC (US); Edward S. Suffern, Chapel Hill, NC (US); Andrew H. Wray, Hillsborough, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 0 days.

(21) Appl. No.: 14/062,364

(22) Filed: Oct. 24, 2013

(65) Prior Publication Data

US 2015/0120885 A1 Apr. 30, 2015

(51) Int. Cl.
*H04L 29/12* (2006.01)
*G06F 9/44* (2006.01)

(52) U.S. Cl.
CPC .......... *H04L 61/2015* (2013.01); *G06F 9/4406* (2013.01)

(58) Field of Classification Search
CPC .............................. H04L 29/06; G06F 9/4416
USPC ........................................................ 709/222
See application file for complete search history.

(56) References Cited

U.S. PATENT DOCUMENTS 7,730,214 B2 6/2010 Kashyap
7,734,743 B2 6/2010 Hernandez et al.
(Continued)

FOREIGN PATENT DOCUMENTS

EP 0425777 B1 6/1996

OTHER PUBLICATIONS

Mellanox Technologies, "Mellanox FlexBoot™—Increase Data Center Efficiency with Multiprotocol Remote Boot Technology", Product Brief, 2010, www.mellanox.com (online), [accessed Apr. 15, 2013], 1 pp., URL: http://www.mellanox.com/related-docs/prod_software/PB_FlexBoot.pdf.
(Continued)

*Primary Examiner* — Vivek Srivastava
*Assistant Examiner* — Sibte Bukhari
(74) *Attorney, Agent, or Firm* — Edward J. Lenart; Katherine S. Brown; Kennedy Lenart Spraggins LLP

(57) ABSTRACT

Loading an operating system of a diskless compute node using a single Virtual Protocol Interconnect ('VPI') adapter, including: setting, by a VPI firmware module during startup of the compute node, an operational mode of the VPI adapter to operate in accordance with a first data communications protocol, the VPI adapter including a preboot execution environment module that supports the first data communications protocol prior to loading an operating system and a driver for the first data communications protocol; retrieving, by the VPI firmware module from a network source via the VPI adapter in accordance with the first data communications protocol, the operating system and a driver for the second data communications protocol; and responsive to loading the operating system and the driver for the second data communications protocol, switching the operational mode of the VPI adapter to operate in accordance with the second data communications protocol.

11 Claims, 3 Drawing Sheets

(56) References Cited

U.S. PATENT DOCUMENTS

| | | | |
|---|---|---|---|
| 7,966,294 B1* | 6/2011 | Gupta et al. | 707/654 |
| 8,006,011 B2* | 8/2011 | Wilkinson et al. | 710/74 |
| 8,209,680 B1* | 6/2012 | Le et al. | 717/174 |
| 8,271,694 B2 | 9/2012 | Sharp et al. | |
| 2010/0287365 A1 | 11/2010 | Watkins et al. | |
| 2011/0296159 A1 | 12/2011 | Hong et al. | |

OTHER PUBLICATIONS

Mellanox Technologies, "Mellanox OFED for Linux User Manual", Sep. 16, 2012, 215 pages, Mellanox Technologies, USA.

Morgan, "Mellanox uncloaks SwitchX network switch-hitter", Apr. 26, 2011, www.TheRegister.co.uk (online), [accessed Apr. 15, 2013], 4 pp, URL: http://www.theregister.co.uk/2011/04/26/mellanox_switchx_switch_chip/.

Wikipedia, "Preboot Execution Environment", en.wikipedia.org (online), [accessed Apr. 15, 2013], 4 pp., URL: http://en.wikipedia.org/wiki/Preboot_Execution_Environment.

Anonymous, "Method and System for Ethernet-less and Diskless Booting with Infiniband Connections", IP.com Prior Art Database (online), Feb. 25, 2013, pp. 1-3, IP.com.

* cited by examiner

LOADING AN OPERATING SYSTEM OF A DISKLESS COMPUTE NODE USING A SINGLE VIRTUAL PROTOCOL INTERCONNECT ('VPI') ADAPTER

BACKGROUND OF THE INVENTION

1. Field of the Invention

The field of the invention is data processing, or, more specifically, methods, apparatus, and products for loading an operating system of a diskless compute node using a single Virtual Protocol Interconnect ('VPI') adapter.

2. Description Of Related Art

Modern computing systems can include many compute nodes that operate independently of each other. One example of such a computing system is a blade center that includes a large number of blade servers. It can be desirable to reduce the hardware resources in each compute node, as hardware resources can be expensive and space-consuming.

SUMMARY OF THE INVENTION

Methods, apparatuses, and products for loading an operating system of a diskless compute node using a single VPI adapter are disclosed in this specification. Loading such an operating system of a diskless compute node may include: setting, by a VPI firmware module during startup of the compute node, an operational mode of the VPI adapter to operate in accordance with a first data communications protocol, the VPI adapter including a preboot execution environment module that supports the first data communications protocol prior to loading an operating system and a driver for the first data communications protocol; retrieving, by the VPI firmware module from a network source via the VPI adapter in accordance with the first data communications protocol, the operating system and a driver for the second data communications protocol; and responsive to loading the operating system and the driver for the second data communications protocol, switching, by the VPI firmware module, the operational mode of the VPI adapter to operate in accordance with the second data communications protocol.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
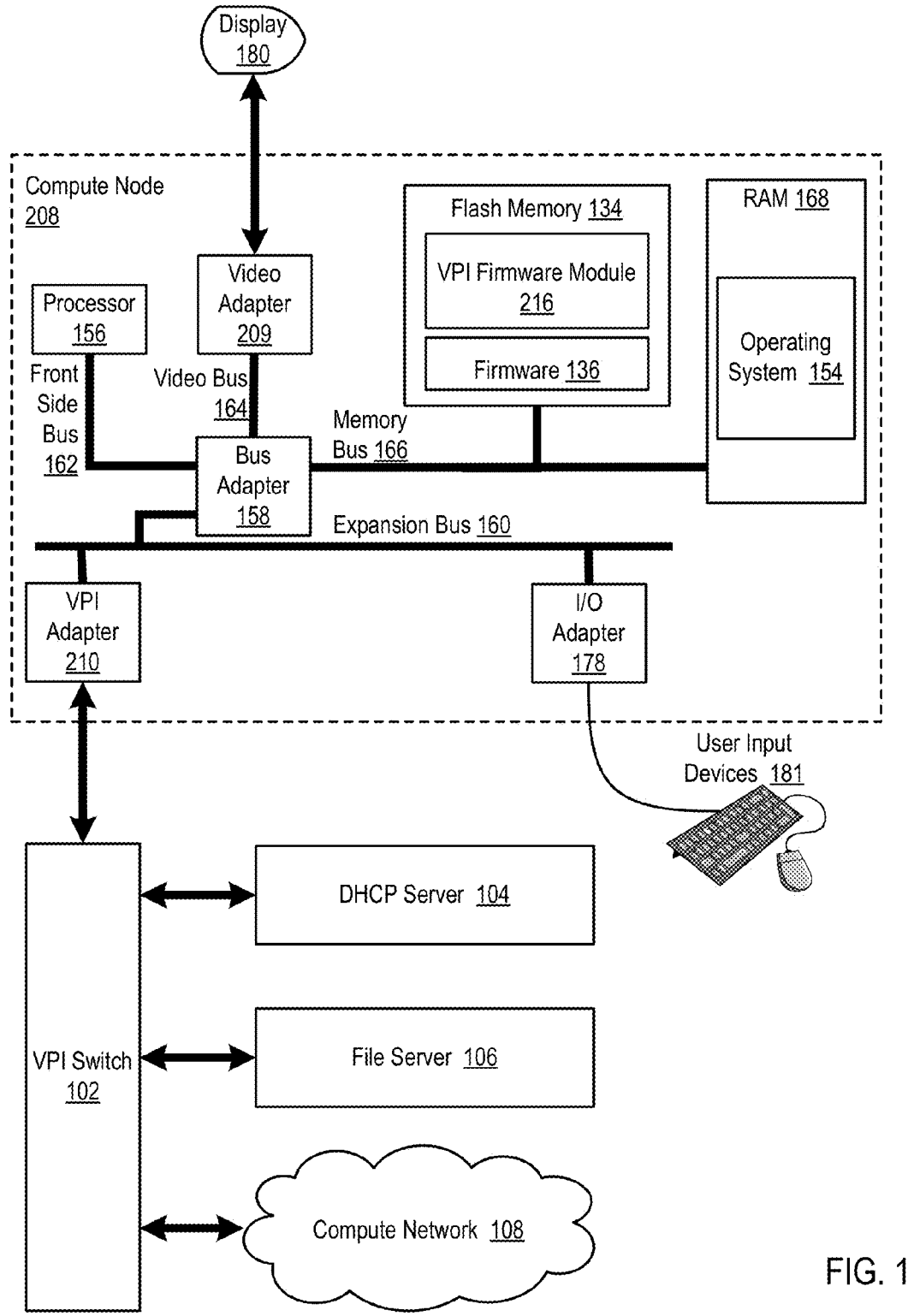
FIG. 1 sets forth a block diagram of automated computing machinery comprising an example diskless compute node for which an operating system may be loaded using a single VPI adapter according to embodiments of the present invention.

Example methods, apparatuses, and products for loading an operating system of a diskless compute node (208) using a single VPI adapter (210) in accordance with the present invention are described with reference to the accompanying drawings, beginning with FIG. 1. FIG. 1 sets forth a block diagram of automated computing machinery comprising an example diskless compute node (208) for which an operating system (154) may be loaded using a single VPI adapter (210) according to embodiments of the present invention. The compute node (208) of FIG. 1 includes at least one computer processor (156) or 'CPU' as well as random access memory (168) ('RAM') which is connected through a high speed memory bus (166) and bus adapter (158) to processor (156) and to other components of the compute node (208).

The compute node (208) of FIG. 1 is 'diskless' in the sense that the compute node (208) does not include a primary boot device, such as a hard disk drive. As such, the compute node (208), at the time of startup, does not include an operating system (154) stored in a hard disk drive. Because the compute node (208) of FIG. 1 does not have a hard disk drive or other form of non-volatile computer memory upon which an operating system (154) is traditionally stored, the operating system (154) must be retrieved from remote storage such as a file server (106).

The compute node (208) of FIG. 1 does include some form of non-volatile computer memory, depicted in this example as flash memory (134). In the example of FIG. 1, the flash memory (134) may be embodied as an electronic non-volatile computer storage device that can be electrically erased and reprogrammed. The flash memory (134) of FIG. 1 includes firmware (136) stored on the flash memory (134). Such firmware (136) can include computer program instructions for controlling the execution of various devices within the compute node (208). The flash memory (134) of FIG. 1 also includes a VPI firmware module (216). The VPI firmware module (216) of FIG. 1 may be embodied as a module of computer program instructions for configuring a VPI adapter (210) and for retrieving and loading an operating system (154) from remote storage via the VPI adapter (210).

The compute node (208) of FIG. 1 includes a VPI adapter (210). The VPI adapter (210) of FIG. 1 is a data communications adapter that supports data communications with multiple types of data communications switches such that a compute node (208) that includes a VPI adapter (210) can support data communications over multiple types of data communications networks. In particular, the VPI adapter (210) can support connectivity with Ethernet switches, InfiniBand switches, emerging Data Center Ethernet switches, InfiniBand to Ethernet and Fibre Channel Gateways, and Ethernet to Fibre Channel gateways.

The compute node (208) of FIG. 1 can load an operating system in a diskless compute node (208) using a single VPI adapter (210) according to embodiments of the present invention by setting, by the VPI firmware module (216) during startup of the compute node (208), an operational mode of the VPI adapter (210) to operate in accordance with a first data communications protocol. In such a way, the operational mode of the VPI adapter (210) can specify the data communications protocol that will be used by the VPI adapter (210) for data communications with other computers over a data communications network. For example, the operational mode of the VPI adapter (210) may initially be set such that the VPI adapter (210) will communicate with other computers over a data communications network using the Ethernet protocol. Setting the operational mode of the VPI adapter (210) may be carried out, for example, by the VPI firmware module (216) sending a message to the VPI adapter (210) during startup of the compute node (208), where the message includes a value that identifies a particular operational mode.

The VPI adapter (210) of FIG. 1 can include a preboot execution environment module that supports the first data communications protocol prior to loading an operating system (154) and a driver for the first data communications protocol. The preboot execution environment module may be embodied, for example, as a preboot execution environment ('PXE') read-only memory ('ROM') that includes enough Ethernet firmware to access a Dynamic Host Control Protocol ('DHCP') server (104) to acquire an IP address and load a full Ethernet driver. In such an example, the preboot execution environment module may support the first data communications protocol (e.g., Ethernet protocol) prior to loading an operating system (154) and also prior to loading a driver for the first data communications protocol.

The compute node (208) of FIG. 1 can further load an operating system in a diskless compute node (208) using a single VPI adapter (210) by retrieving, by the VPI firmware module (216) from a network source via the VPI adapter (210), the operating system (204) and a driver (206) for the second data communications protocol. In the example of FIG. 1, the network source is depicted as being a file server (106) that includes one or more operating systems (154), device drivers, and other files for use by the compute node (208). Retrieving the operating system (154) and a driver for the second data communications protocol may be carried out, for example, once the compute node (208) has accessed the DHCP server (104) to acquire an IP address and load a full Ethernet driver. In such an example, once the full Ethernet driver has been loaded, the compute node (208) can access the file server (106) via the VPI adapter (210) using the Ethernet protocol. The compute node (208) can subsequently download the operating system (154) and a driver for the second data communications protocol, such as the InfiniBand protocol, from the file server (106). In such a way, the operating system (154) and the driver for the second data communications protocol may be retrieved via the VPI adapter (210) in accordance with the first data communications protocol (e.g., Ethernet protocol).

The compute node (208) of FIG. 1 can further load an operating system (154) in a diskless compute node (208) using a single VPI adapter (210) by switching, by the VPI firmware module (216), the operational mode of the VPI adapter (210) to operate in accordance with the second data communications protocol. Switching the operational mode of the VPI adapter (210) to operate in accordance with a second data communications protocol such as the InfiniBand protocol may be carried out, for example, by the VPI firmware module (216) sending a message to the VPI adapter (210), where the message includes a value that identifies a particular operational mode. In such a way, the VPI adapter (210) may support loading the operating system (154) in accordance with the first data communications protocol and also subsequently support ongoing data communications in accordance with the second data communications protocol. Switching the operational mode of the VPI adapter (210) to operate in accordance with the second data communications protocol may be carried out in response to loading the operating system (154) and the driver for the second data communications protocol.

In the example embodiment depicted in FIG. 1, the VPI adapter (210) of the compute node (208) is coupled to a VPI switch (102). The VPI switch (102) is coupled to the DHCP server (104), the file server (106), and to a compute network (108) that can include additional compute nodes. In such a way, the VPI switch (102) can facilitate data communications connectivity between the compute node (208), the DHCP server (104), the file server (106), and the compute network (108). The VPI switch (102) of FIG. 1 can include a variety of data communications interfaces and data communications ports. For example, the DHCP server (104) and the file server (106) may be coupled to the VPI switch (102) via Ethernet ports that are included in the VPI switch (102) while the compute network (108) is coupled to the VPI switch (102) via InfiniBand ports that are included in the VPI switch (102). In addition, the VPI switch (102) may also include a VPI interface and VPI ports through which the VPI adapter (210) of the compute node (208) may be coupled for data communications with the VPI switch (102).

The example compute node (208) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example compute node (208) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The compute node (208) of FIG. 1 also includes volatile memory, depicted here as RAM (168). Stored in RAM (168) is an operating system (154) that is loaded after startup of the compute node (208). Operating systems for use by the compute node (208) can include UNIX™, Linux™, Microsoft Windows 7™, Microsoft XP™, AIX™, IBM's i5/OS™, and others as will occur to those of skill in the art.

Figure 2:
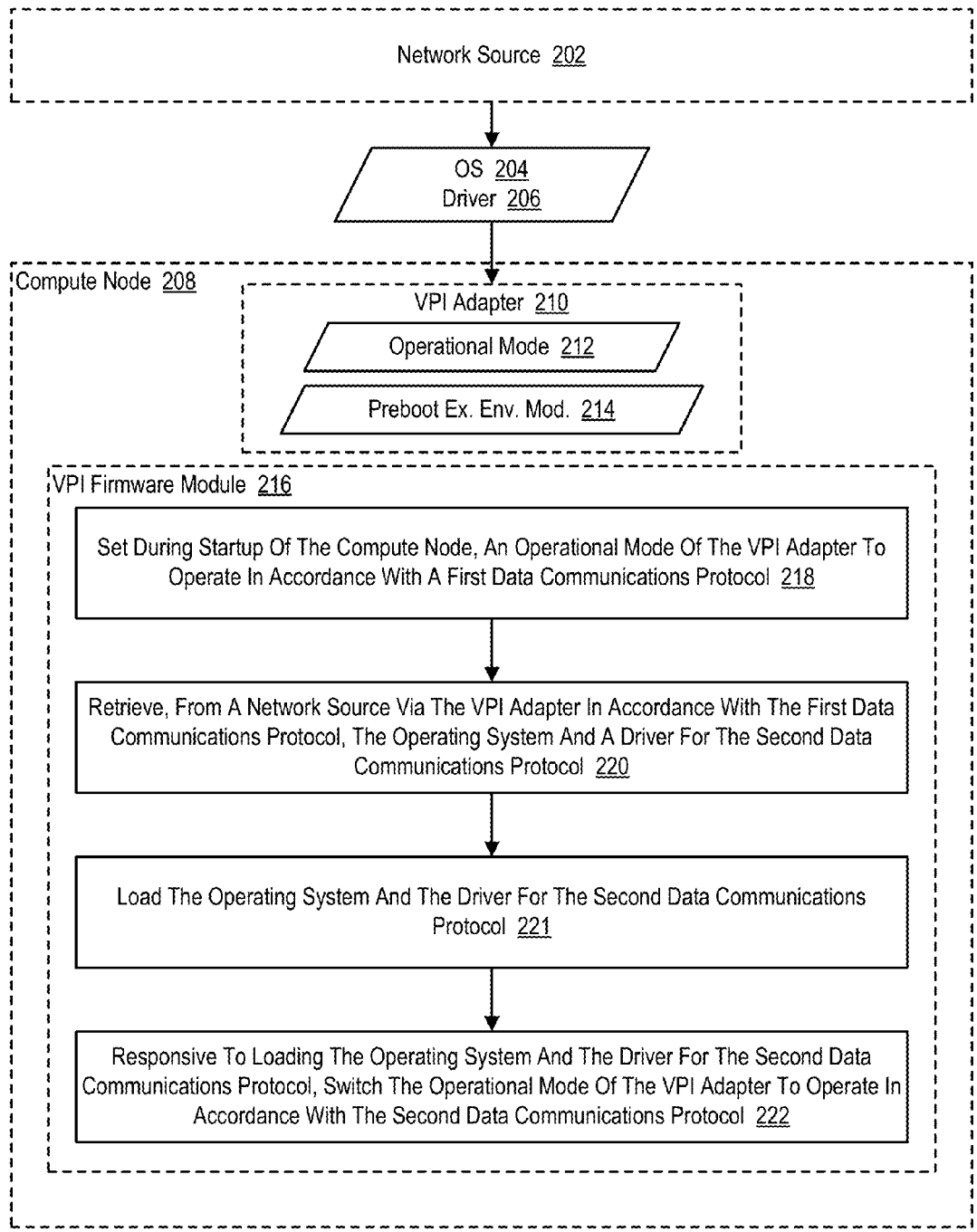
FIG. 2 sets forth a flow chart illustrating an example method for loading an operating system of a diskless compute node using a single VPI adapter according to embodiments of the present invention.

For further explanation, FIG. 2 sets forth a flow chart illustrating an example method for loading an operating system (204) of a diskless compute node (208) using a single VPI adapter (210) according to embodiments of the present invention. In the example method of FIG. 2, the operating system (204) must be retrieved from remote storage—computer memory that resides outside of the compute node (208)—by virtue of the diskless nature of the compute node (208). That is, because the compute node (208) of FIG. 2 does not have a disk drive or other form of non-volatile computer memory upon which the operating system (204) is stored, the operating system (204) must be retrieved from remote storage.

The example method of FIG. 2 is carried out by a VPI firmware module (216). The VPI firmware module (216) of FIG. 2 may be embodied as a module of computer program instructions executing on computer hardware. The VPI firmware module (216) may include computer program instructions for configuring a VPI adapter (210) and for retrieving and loading the operating system (204) from remote storage via the VPI adapter (210). The VPI firmware module (216) of FIG. 2 may be stored in computer memory such as flash memory, an EEPROM, or other special purpose non-volatile memory for storing special purpose firmware modules such as the VPI firmware module (216).

The compute node (208) of FIG. 2 includes a VPI adapter (210). The VPI adapter (210) of FIG. 2 is a data communications adapter that supports data communications with multiple types of data communications switches such that a compute node (208) that includes a VPI adapter (210) can support data communications over multiple types of data communications network. In particular, the VPI adapter (210) can support connectivity with Ethernet switches, InfiniBand switches, emerging Data Center Ethernet switches, InfiniBand to Ethernet and Fibre Channel Gateways, and Ethernet to Fibre Channel gateways.

The example method of FIG. 2 includes setting (218), by the VPI firmware module (216) during startup of the compute node (208), an operational mode (212) of the VPI adapter (210). In the example method of FIG. 2, the operational mode (212) of the VPI adapter (210) is set (218) to operate in accordance with a first data communications protocol such that the operational mode (212) of the VPI adapter (210) can specify the data communications protocol that will be used by the VPI adapter (210) for data communications with other computers over a data communications network. For example, the operational mode (212) of the VPI adapter (210) may initially be set (218) such that the VPI adapter (210) will communicate with other computers over a data communications network using the Ethernet protocol. In the example method of FIG. 2, setting (218) the operational mode (212) of the VPI adapter (210) may be carried out, for example, by the VPI firmware module (216) sending a message to the VPI adapter (210) during startup of the compute node (208), where the message includes a value that identifies a particular operational mode (212).

The VPI adapter (210) of FIG. 2 includes a preboot execution environment module (214) that supports the first data communications protocol prior to loading an operating system and a driver for the first data communications protocol. In the example method of FIG. 2, the preboot execution environment module (214) may be embodied, for example, as a preboot execution environment ('PXE') ROM that includes enough Ethernet firmware to access a Dynamic Host Control Protocol ('DHCP') server to acquire an IP address and load a full Ethernet driver. In such an example, the preboot execution environment module (214) may therefore support the first data communications protocol (e.g., Ethernet protocol) prior to loading an operating system and also prior to loading a driver for the first data communications protocol.

The example method of FIG. 2 also includes retrieving (220), by the VPI firmware module (216) from a network source (202) via the VPI adapter (210), the operating system (204) and a driver (206) for the second data communications protocol. In the example method of FIG. 2, the network source (202) may be embodied, for example, as a file server that includes one or more operating systems (204), device drivers (206), and other files for use by the compute node (208). Retrieving (220) the operating system (204) and a driver (206) for the second data communications protocol may be carried out, for example, once the compute node (208) has accessed a DHCP server to acquire an IP address and load a full Ethernet driver. In such an example, once the full Ethernet driver has been loaded such that the compute node (208) can access a file server via the VPI adapter (210) using the Ethernet protocol and download the operating system (204) and a driver (206) for the second data communications protocol such as the InfiniBand protocol. In such a way, the operating system (204) and the driver (206) for the second data communications protocol may be retrieved (220) via the VPI adapter (210) in accordance with the first data communications protocol (e.g., Ethernet protocol).

The example method of FIG. 2 also includes loading (221) the operating system (204) and the driver (206) for the second data communications protocol. In the example method of FIG. 2, loading (221) the operating system (204) may be carried out, for example, by writing the operating system (204) to volatile RAM in the compute node (208). In the example method of FIG. 2, loading (221) the driver (206) for the second data communications protocol may be carried out, for example, by writing the driver (206) for the second data communications protocol to memory on the VPI adapter (210), by writing the driver (206) for the second data communications protocol to memory accessible by the VPI adapter (210), and in other ways as will occur to those of skill in the art.

The example method of FIG. 2 also includes switching (222), by the VPI firmware module (216), the operational mode (212) of the VPI adapter (210) to operate in accordance with the second data communications protocol. In the example method of FIG. 2, switching (222) the operational mode (212) of the VPI adapter (210) to operate in accordance with a second data communications protocol such as the InfiniBand protocol may be carried out, for example, by the VPI firmware module (216) sending a message to the VPI adapter (210), where the message includes a value that identifies a particular operational mode (212). In such a way, the VPI adapter (210) may support loading the operating system (204) in accordance with the first data communications protocol and subsequently support ongoing data communications in accordance with the second data communications protocol. In the example method of FIG. 2, switching (222) the operational mode (212) of the VPI adapter (210) to operate in accordance with the second data communications protocol is carried out in response to loading the operating system (204) and the driver (206) for the second data communications protocol.

Figure 3:
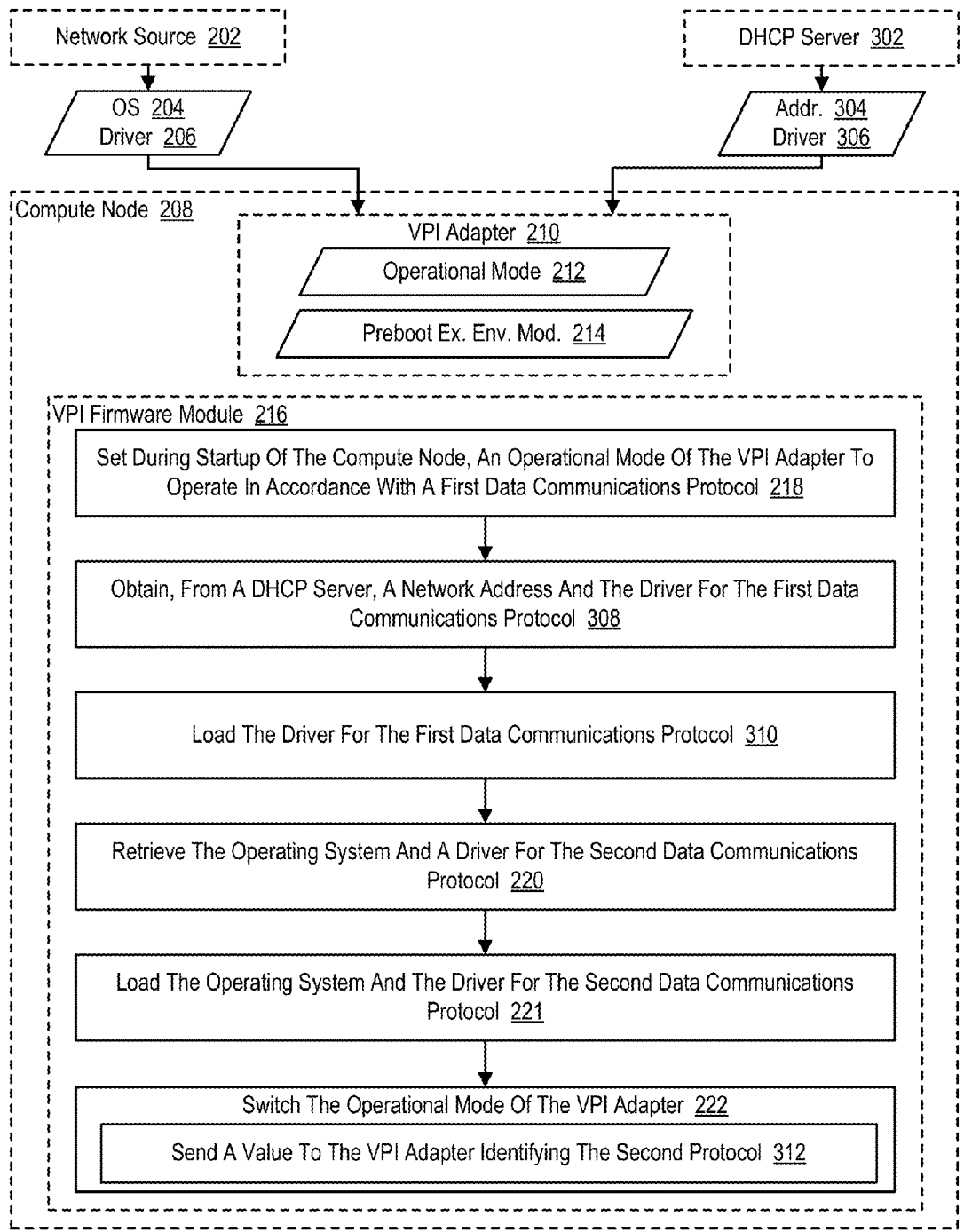
FIG. 3 sets forth a flow chart illustrating an additional example method for loading an operating system of a diskless compute node using a single VPI adapter according to embodiments of the present invention.

For further explanation, FIG. 3 sets forth a flow chart illustrating an additional example method for loading an operating system (204) of a diskless compute node (208) using a single VPI adapter (210) according to embodiments of the present invention. The example method of FIG. 3 is similar to the example method of FIG. 2 as it also includes setting (218) an operational mode (212) of the VPI adapter (210), retrieving (220) the operating system (204) and a driver (206) for the second data communications protocol, loading (221) the operating system (204) and the driver (206) for the second data communications protocol, and switching (222) the operational mode (212) of the VPI adapter (210) to operate in accordance with the second data communications protocol.

The example method of FIG. 3 also includes obtaining (308), by the VPI firmware module (216) from a DHCP server (308), a network address (304) and the driver (306) for the first data communications protocol. In the example method of FIG. 3, the VPI adapter (210) may include a PXE ROM that includes enough Ethernet firmware to access the DHCP server (308) to acquire an IP address and a full Ethernet driver. In such a way, the VPI firmware module (216) may obtain (308) the network address (304) and the driver (306) for the first data communications protocol via the VPI adapter (210) in accordance with the first data communications protocol.

The example method of FIG. 3 also includes loading (310) the driver (306) for the first data communications protocol. In the example method of FIG. 3, loading (310) the driver (306) for the first data communications protocol may be carried out by writing the driver (306) for the first data communications protocol to memory on the VPI adapter (210), by writing the driver (306) for the first data communications protocol to memory that is accessible by the VPI adapter (210), and in other ways as will occur to those of skill in the art.

In the example method of FIG. 3, switching (222) the operational mode (212) of the VPI adapter (210) to operate in accordance with the second data communications protocol may include sending (312), by the VPI firmware module (216) to the VPI adapter (210), a value identifying the second data communications protocol. In the example method of FIG. 3, the VPI adapter (210) can include a table or other data structure that associates values with a plurality of data communications protocols for use by the VPI adapter (210). In such an example, the VPI firmware module (216) can include a similar table or data structure and can therefore send (312) a value identifying the second data communications protocol to the VPI adapter (210). For example, the VPI firmware module (216) can send (312) a message to the VPI adapter (210) that includes the value identifying the second data communications protocol.

Example embodiments of the present invention are described largely in the context of a fully functional computer system for loading an operating system of a diskless compute node using a single Virtual Protocol Interconnect VPI adapter. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computer processor and a computer memory operatively coupled to the computer processor, the computer memory including computer program instructions that, when executed by the computer processor, cause the apparatus to carry out the steps of:
    setting during startup of the compute node, an operational mode of a VPI adapter to operate in accordance with a first data communications protocol, the VPI adapter is a data communications adapter including a preboot execution environment module located in memory of the VPI adapter that supports the first data communications protocol prior to loading an operating system and prior to loading a driver for the first data communications protocol;
    obtaining from a dynamic host control protocol ('DHCP') server, a network address and the driver for the first data communications protocol;
    loading the driver for the first data communications protocol;
    retrieving from a network source via the VPI adapter in accordance with the first data communications protocol, the operating system and a driver for the second data communications protocol;
    loading the operating system and the driver for the second data communications protocol; and
    responsive to loading the operating system and the driver for the second data communications protocol, switching the operational mode of the VPI adapter to operate in accordance with the second data communications protocol.

2. The apparatus of claim 1 wherein the first data communications protocol is an Ethernet protocol and the second data communications protocol is an Infiniband protocol.

3. The apparatus of claim 1 wherein the VPI adapter is coupled for data communications with the network source via a VPI switch.

4. The apparatus of claim 1 wherein the VPI adapter is coupled for data communications with a dynamic host control protocol ('DHCP') server via a VPI switch.

5. The apparatus of claim 1 wherein switching the operational mode of the VPI adapter to operate in accordance with the second data communications protocol further comprises sending, to the VPI adapter, a value identifying the second data communications protocol.

6. A computer program product including a non-transitory computer readable medium, the computer program product comprising computer program instructions that, when executed, cause a computer to carry out the steps of:
    setting during startup of the compute node, an operational mode of a VPI adapter to operate in accordance with a first data communications protocol, the VPI adapter is a data communications adapter including a preboot execution environment module located in memory of the VPI adapter that supports the first data communications protocol prior to loading an operating system and prior to loading a driver for the first data communications protocol;
    obtaining from a dynamic host control protocol ('DHCP') server, a network address and the driver for the first data communications protocol;
    loading the driver for the first data communications protocol;
    retrieving from a network source via the VPI adapter in accordance with the first data communications protocol, the operating system and a driver for the second data communications protocol;
    loading the operating system and the driver for the second data communications protocol; and
    responsive to loading the operating system and the driver for the second data communications protocol, switching the operational mode of the VPI adapter to operate in accordance with the second data communications protocol.

7. The computer program product of claim 6 wherein the first data communications protocol is an Ethernet protocol and the second data communications protocol is an Infiniband protocol.

8. The computer program product of claim 6 wherein the VPI adapter is coupled for data communications with the network source via a VPI switch.

9. The computer program product of claim 6 wherein the VPI adapter is coupled for data communications with a dynamic host control protocol ('DHCP') server via a VPI switch.

10. The computer program product of claim 6 wherein switching the operational mode of the VPI adapter to operate in accordance with the second data communications protocol further comprises sending, to the VPI adapter, a value identifying the second data communications protocol.

11. The computer program product of claim 6 wherein the computer readable medium comprises a storage medium.

* * * * *